United States Patent [19]
Torimaru

[11] 4,059,014
[45] Nov. 22, 1977

[54] ELECTROMAGNETIC FLOWMETER

[75] Inventor: Takashi Torimaru, Musashino, Japan

[73] Assignee: Hokushin Electric Works, Ltd., Tokyo, Japan

[21] Appl. No.: 742,831

[22] Filed: Nov. 18, 1976

[30] Foreign Application Priority Data

Nov. 28, 1975 Japan .................................. 50-142605

[51] Int. Cl.$^2$ ............................................. G01F 1/60
[52] U.S. Cl. ............................................. 73/194 EM
[58] Field of Search .................................. 73/194 EM

[56] References Cited
U.S. PATENT DOCUMENTS

| | | | |
|---|---|---|---|
| 3,783,687 | 1/1974 | Mannherz et al. | 73/194 EM |
| 3,991,612 | 11/1976 | Mannherz et al. | 73/194 EM |
| 3,996,797 | 12/1976 | Torimaru et al. | 73/194 EM |

*Primary Examiner*—Charles A. Ruehl

[57] ABSTRACT

An electromagnetic flowmeter in which the fluid to be metered is conducted through a flow tube where it intersects a magnetic field established by an electromagnet. A pair of electrodes each having a relatively large surface area are mounted at diametrically-opposed positions in the flow tube whereby the electromotive force induced in the fluid and detected by the electrodes when the fluid velocity profile is non-uniform, is averaged and an electromotive force proportional to average flow velocity is obtained. The electromagnet is energized by a low-frequency wave produced by applying the output of a full-wave rectifier coupled to a commercial power line to the excitation coils of the electromagnet through an electronic switching element that acts to periodically chop the full-wave rectified voltage in accordance with high-frequency pulses whose frequency is higher than the power line frequency, the duty cycle thereof being gradually modulated by a low-frequency wave whose frequency is less than the power line frequency.

7 Claims, 8 Drawing Figures

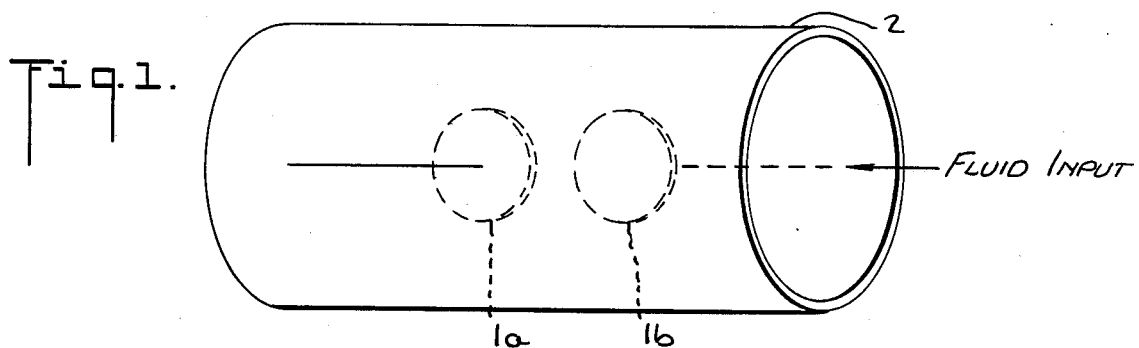
Fig.1.
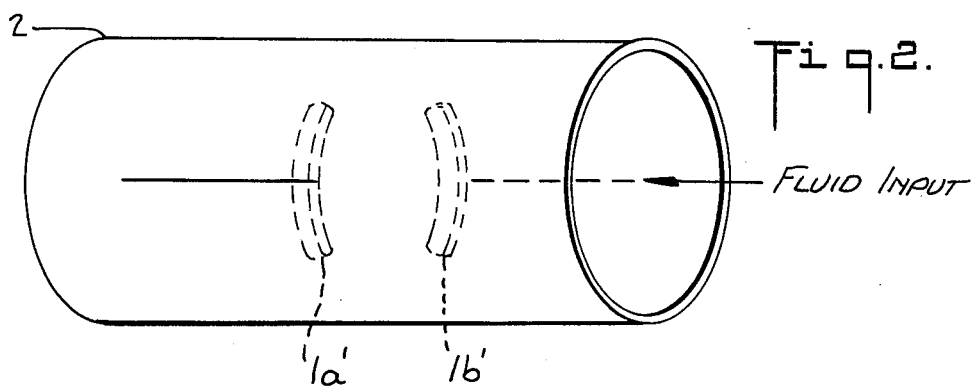
Fig.2.
Fig.4.
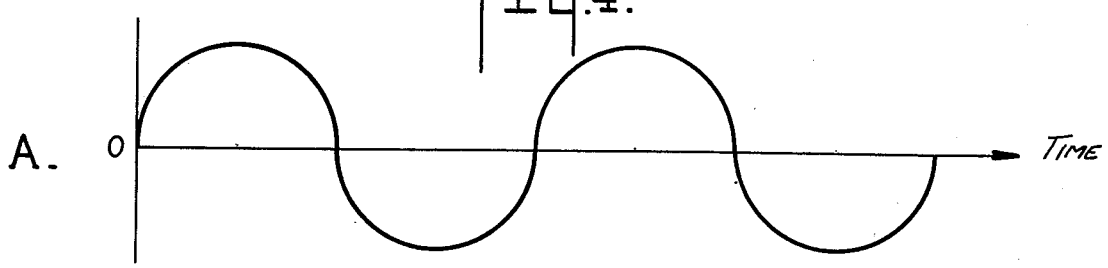
A.
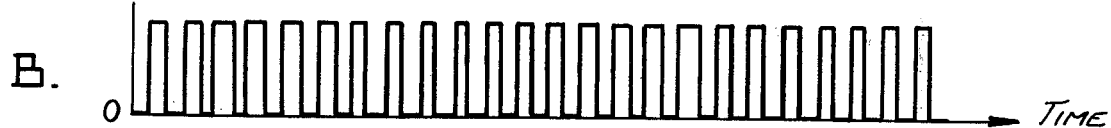
B.
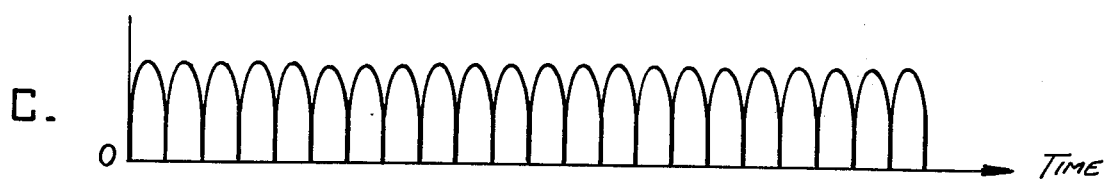
C.
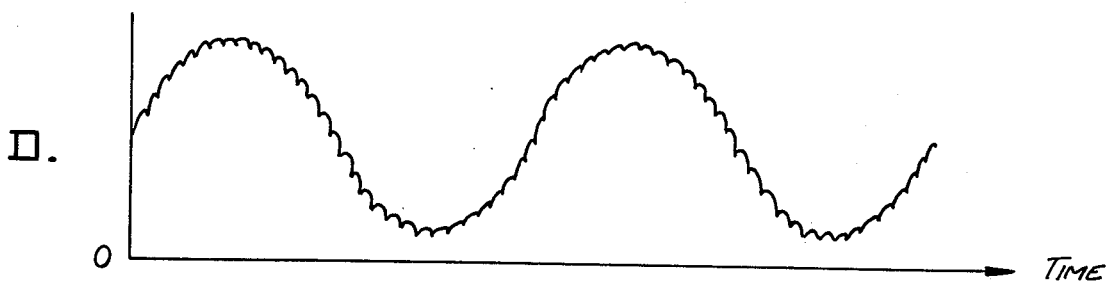
D.

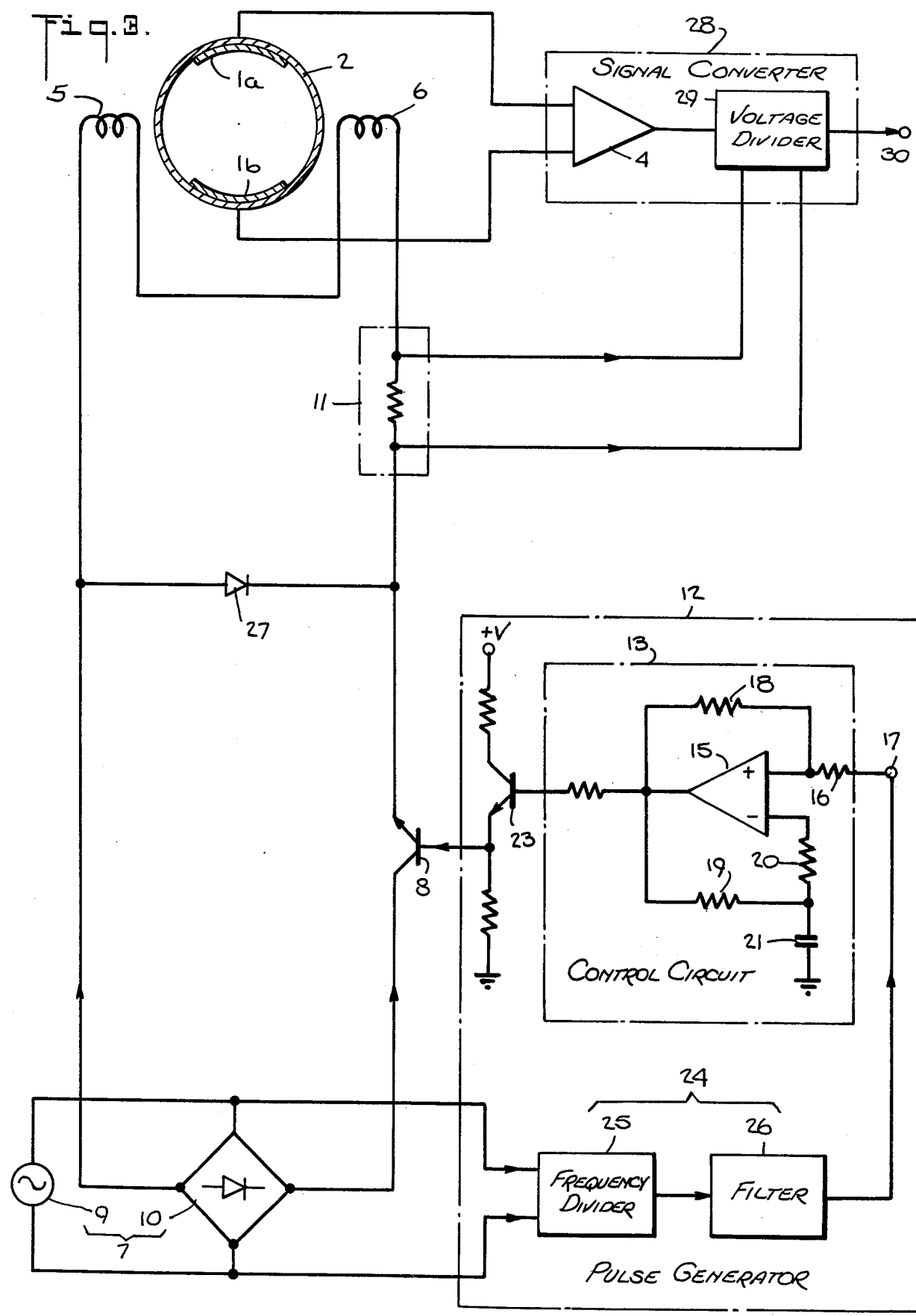

ELECTROMAGNETIC FLOWMETER

BACKGROUND OF INVENTION

This invention relates generally to electromagnetic flowmeters, and more particularly to a flowmeter whose electrodes have a relatively large surface area and whose electromagnet coils are excited by a low-frequency voltage.

In the conventional electromagnetic flowmeter, the fluid to be metered is conducted through a flow tube having a pair of diametrically-opposed point electrodes. The fluid intersects an electromagnetic field, thereby inducing an electromotive force in the fluid to generate an electrode signal whose magnitude is a function of flow rate.

In order to minimize the effect of the flow velocity profile on the accuracy of an electromagnetic flowmeter, it is known to use in lieu of point electrodes, arcuate electrodes or electrodes having a button-shape form. The reason for this is that the undesirable effects of a non-uniform flow velocity profile on meter accuracy can be eliminated by using electrodes having a large surface area, in that the electromotive force then induced in the fluid is averaged and a force proportional to average flow velocity is produced. Thus in the case of a flowmeter having a flow tube of rectangular cross-section, the influence of the resultant non-uniform flow velocity profile on meter precision can be minimized by using electrodes of large surface area.

Despite the distinct advantages gained by using electrodes of large surface area, their use has not been widespread and has heretofore been more or less restricted to flow measurement under high-velocity flow conditions. The reason for this lack of popularity is that electrodes having a larger surface area adversely affect the zero point stability of the meter. When, as is generally the case, the electromagnet coils of the flowmeter are excited at the frequency of the commercial power line (i.e., 50 or 60 Hz), this excitation induces eddy currents which flow into the electrodes. These eddy currents become greater with larger electrode surfaces, thereby introducing a significant zero drift error.

To overcome this drawback, it has heretofore been the practice to provide an excitation system for the electromagnet coils which produces the low-frequency wave whose frequency is much lower than the usual 50 or 60 Hz commercial power line frequency. In this known system, a low-frequency wave such as 10 Hz is generated by a low-frequency oscillator energized by a DC power source. The output of the low-frequency oscillator is amplified and then applied to the excitation coils of the electromagnetic flowmeter.

Though with an excitation system of this known type one is able to obviate the problem of eddy currents and thereby provide zero point stability while using larger surface area electrodes to eliminate the undesirable effects encountered with a non-uniform velocity profile, this system suffers from certain practical disabilities.

In the case of an electromagnetic flowmeter having a larger diameter flow tube, the power requirements for a meter of this type are considerable, and this dictates an excitation system that includes a DC source of substantial size for the low-frequency oscillator, a large scale power amplifier, and so on.

And even though a flowmeter of larger diameter usually precludes the employment of an excitation system having a large DC source, the fact remains that such meters must often be installed in difficult situations which give rise to a non-uniform flow velocity profile, such as an installation adjacent an elbow in the flow line which acts to introduce considerable disturbances in the fluid velocity profile. Yet while large diameter meters are rendered inaccurate by the non-uniform flow velocity profile to which they are subjected, it is not feasible to use a known type of excitation system in conjunction with large surface electrodes to eliminate this problem.

SUMMARY OF INVENTION

In view of the foregoing, it is the main object of this invention to provide an improved low-frequency excitation system for an electromagnetic flowmeter in which the adverse effects of a non-uniform flow velocity profile and zero drift error are eliminated, whereby highly accurate flow rate readings are obtained.

Also an object of this invention is to provide an electromagnetic flowmeter having a large diameter flow tube, the meter operating in conjunction with a simple, low-cost, low-frequency excitation system.

Briefly state, these objects are attained in a flowmeter in which the fluid to be metered is conducted through a flow tube in which it intersects a magnetic field established by an electromagnet to induce an electromotive force in the fluid. A pair of electrodes each having a relatively larger surface area are mounted at diametrically-opposed positions in the flow tube whereby the electromotive force induced in the fluid and detected by the electrodes is averaged when the fluid velocity profile is non-uniform, and an electromotive force proportional to average flow velocity is obtained.

The electromagnet is energized by a low-frequency wave produced by applying the output of a full-wave rectifier coupled to a commercial power line to the excitation coils of the electromagnet through an electronic switching element that periodically chops the rectified voltage in accordance with high-frequency pulses whose frequency is higher than the power line frequency, the duty cycle thereof being gradually modulated by a low-frequency wave whose frequency is below that of the power line.

OUTLINE OF DRAWING

For a better understanding of the invention as well as other objects and further features thereof, reference is made to the following detailed description to be read in conjunction with the accompanying drawings, wherein:

FIG. 1 is a view of a flow tube in an electromagnetic flowmeter provided with button-shaped electrodes;

FIG. 2 shows a flow tube with arcuate electrodes;

FIG. 3 is a schematic diagram of a first preferred embodiment of a low-frequency excitation system for an electromagnetic flowmeter in accordance with the invention;

Figure 5:
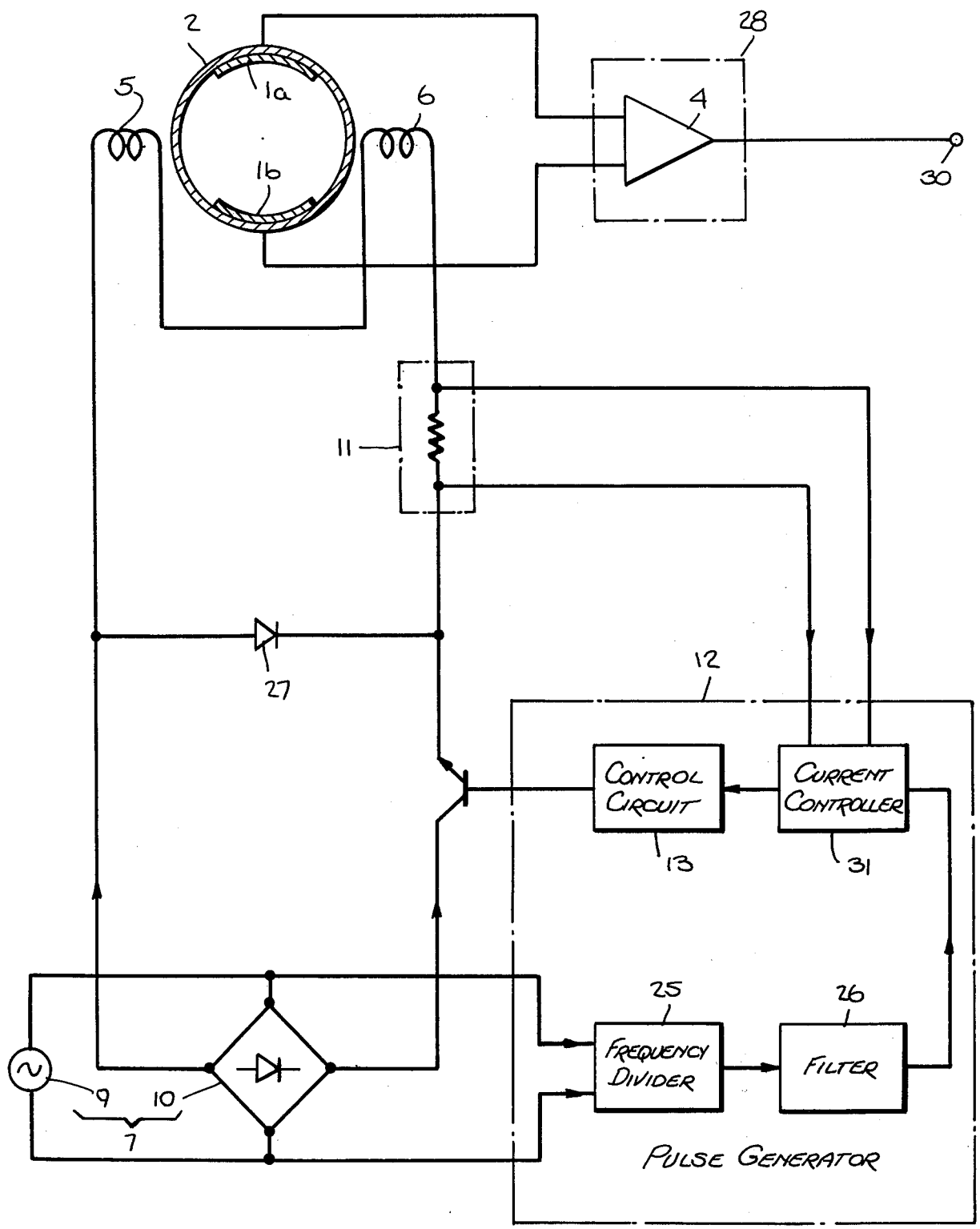

FIGS. 4A to D are waveforms illustrative of the operation of the low-frequency excitation system; and FIG. 5 is a schematic diagram of a second preferred embodiment of the system.

DESCRIPTION OF INVENTION

First Embodiment:

A low-frequency excitation system in accordance with the invention is used in conjunction with an electromagnetic flowmeter having diametrically-opposed electrodes of relatively larger surface area to eliminate the adverse effects of a non-uniform flow velocity profile. These large surfaces can be realized, as shown in FIG. 1, by button-shaped electrodes 1a and 1b mounted within a flow tube 2, or, as shown in FIG. 2, by arcuate electrodes 1a' and 1b'. In the case of buttonshaped electrodes, their surfaces are made substantially greater than the cross-sectional plane of tube 2, and in the case of arcuate electrodes, the length thereof spanning the inner circumference of the tube is made considerably longer than the diameter of the tube.

FIG. 3 shows flow tube 2 with electrodes 1a and 1b therein a diametrically-opposed positions therein, the electrodes having a relatively larger surface; i.e., more than one fourth of the tube's cross-sectional plane normal to the longitudinal flow axis in tube 2, the electrodes spanning a considerable portion of the total tube circumference.

Serially-connected excitation coils 5 and 6 act to generate a magnetic field in the tube whose lines of flux are perpendicular both to the transverse axis passing through electrodes 1a and 1b normal to the longitudinal axis of the flow tube, the coils being arranged at opposed positions relative to the tube. The signal induced in electrodes 1a and 1b as a function of the flow rate is applied to amplifier 4 of a signal converter 28 whose output appears at terminal 30.

A switching element 8 in the form of a transistor is interposed between excitation coils 5 and 6 and an electric power source, generally designated by reference numeral 7. Power source 7 is constituted by a full-wave bridge rectifier 10 whose input junctions are connected to a commercial a-c power line 9. The output junctions of bridge 10 are connected between the collector of switching transistor 8 and one end of excitation coil 5. The emitter of transistor 8 is connected through resistor 11 to one end of coil 6 whose other end is connected to the other end of coil 5. Thus when excitation current flow through serially-connected coils 5 and 6, a voltage drop is developed across resistor 11 to provide a reference signal.

Switching transistor 8 is an "on-off" operated by a high-frequency pulse train (i.e., 3 kHz) generated by a pulse generator 12 whose duty cycle is varied at a low frequency rate that is less than the frequency of the commerical power line. Pulse generator 12 is provided with a control circuit 13 which acts to supply an "on-off" control signal to the base of transistor 8.

Control circuit 13 is constituted by an operational amplifier 15 whose non-inverting (+) input is connected both to an input terminal 17 through a resistor 16 and to the amplifier output through a positive feedback resistor 18. The output of amplifier 15 is also connected to its inverting (−) input through serially-connected resistors 19 and 20, the junction of these resistors being connected to a reference level through a capacitor 21.

The positive feedback ratio of amplifier 15 is determined by the ratio of the ohmic value of resistors 16 and 18. On the other hand, in the negative feedback loop formed by resistors 19 and 20, capacitor 21 coupled thereto functions as a first order lag element. Accordingly, adjustment of the inverting frequency and/or the duty cycle of the control circuit can be effected by selection of the constants in the respective feedback loops.

In the excitation system illustrated in FIG. 3, the output of operational amplifier 15 is modulated by a voltage applied to input terminal 17. The output of amplifier 15 feeds a transistor 23 whose emitter is connected to the base of switching transistor 8. As a consequence, transistor 8 is alternately rendered on and off at a rate in accordance with the output pulses yielded by amplifier 15. The "on-off" duty cycle of these pulses is slowly modulated by a low-frequency sinusoidal wave whose frequency is less than that of the commercial power line frequency (i.e., $\frac{1}{4}$th to $\frac{1}{8}$th of the usual 50 to 60 Hz power line frequency).

To generate this low-frequency modulating wave, use is made of a low-frequency sinusoidal wave oscillator 24 composed of a frequency divider 25 and a filter 26. Divider 25 is coupled to the output of a-c power-line source 9 and acts to divide down the frequency thereof to produce a rectangular wave whose frequency is a sub-multiple of the line frequency. Filter 26 functions to shape the rectangular-wave output of frequency divider 25 to produce an output wave whose form is substantially sinusoidal. The low-frequency sinusoidal wave output from the low-frequency oscillator 24 is applied to input terminal 17 of control circuit 13.

The function of control circuit 13 will now be explained in greater detail in connection with FIGS. 4A to D. The "on-off" duty cycle of the output yielded by operational amplifier 15 is proportional to the instantaneous sampling value of the low-frequency sinusoidal wave produced by oscillator 24. Control circuit 13 is pre-adjusted so that the duty cycle assumes, for example, a $\frac{1}{2}$ value when the low-frequency wave crosses zero.

FIG. 4A shows the low-frequency sinusoidal wave output of oscillator 24, while FIG. 4B shows the output of operational amplifier 15. It will be evident therefrom that the duty cycle assumes its maximum value at the positive peaks of the low-frequency sinusoidal wave, and its minimum value at the negative peaks of this wave. Between the positive and negative peaks, the duty cycle varies gradually in the manner of a sine wave.

The full-wave, unfiltered rectifier output of power source 7 is shown in FIG. 4C. This rectified output voltage is applied to switching transistor 8 which acts to chop this voltage in accordance with the pulse signal shown in FIG. 4B to produce a chopped, unfiltered rectified output that is applied to excitation coils 5 and 6.

When transistor 8 is in its "on" state, a voltage proportional to the instantaneous voltage of the full-wave rectified output is applied to coils 5 and 6, but when the switching transistor is in its "off" state, the current then developed is derived from the energy stored in these coils. Thus current flows through a diode 27 shunted across coils 5 and 6 through resistor 11, the current flowing therethrough in the same direction as the current direction during the "on" state so as to maintain a constant current condition.

Thus the "on-off" duty cycle of switching transistor 8, whose "on-off" frequency is extremely high relative to the commercial power line frequency of source 9, is modulated by a low-frequency sinusoidal wave whose frequency is a submultiple of the line frequency. As a result, a low-frequency sinusoidal current of the type illustrated in FIG. 4D flows through excitation coils 5 and 6.

Though the voltage flowing through excitation coils 5 and 6 has an unfiltered ripple component, since these coils have a relatively high inductance they function effectively as a filter choke. Hence, as is evident in FIG. 4, the ripple components of the excitation current are substantially eliminated without the need for separate filter chokes.

Diode 27 serves to block out unwanted kickback voltages, these being produced when transistor 8 is in its "off" state and being directed toward the switching circuit composed of transistors 8 and 23 in conjunction with power source 7.

The signals induced in meter electrodes 1a and 1b are applied through amplifier 4 to one input of a voltage-dividing circuit 29 included in signal converter 28. The reference signal proportional to the current flowing in excitation coils 5 and 6 which is developed across resistor 11 in series with these coils is applied to the other input of divider 29. Thus the induced signal output of amplifier 4 is divided in circuit 29 by the reference signal to produce a mean flow signal proportional to the average velocity of the fluid being metered. This mean flow signal appears at output terminal 30 of the signal converter.

Second Embodiment

Referring now to FIG. 5, there is shown a second embodiment of the invention. In this figure, circuit elements of the system which correspond to those found in the first embodiment are designated by like reference numerals. The advantage of the second embodiment over the first is that fluctuating components included in the excitation current can be eliminated without the need for the dividing circuit required in FIG. 3.

An excitation-current controller 31 is interposed between filter 26 and control circuit 13. Controller 31 compares the reference signal derived from resistor 11 with the low-frequency signal yielded by filter 26 to produce an error signal depending on the deviation therebetween. This error signal is applied to control circuit 13 and acts to control the "on-off" duty cycle of switching transistor 8 so as to maintain constant the amplitude of the excitation current.

Modifications:

Rather than connect the output of control circuit 13 directly to switching transistor 8, one may interpose a photo-coupler therebetween, thereby isolating that section of the system which includes the "on-off" control means from that section which includes the electric power source. Hence the reference voltage level may be freely determined.

Though a switching transistor 8 is used in the first and second embodiments as the on-off switching element, this transistor may be replaced by other switching means such as a gate actuated thyristor or other solid-state switching devices.

While in the first and second embodiments a low-frequency sinusoidal wave acts to vary the on-off duty cycle, one may use in lieu thereof a triangular wave which slowly varies. By the use of gradually-varying wave, harmonic components included in the excitation current are rendered negligible as compared to those produced in an arrangement making use of a rectangular wave. Moreover, if instead of single phase a-c power as shown, use is made of a polyphase power source, ripple components in the excitation current may be substantially reduced.

From the foregoing, it will be evident that an electromagnetic flowmeter in accordance with the invention possesses the following significant advantages:

A. Because the electromagnetic coils are excited by a low-frequency wave, the adverse effects of eddy currents are avoided.

B. Because low-frequency excitation provides zero point stability, it makes possible the use of electrodes having a large surface area, thereby overcoming the effects of a non-uniform flow velocity profile on meter accuracy.

C. Because the excitation current is generated by a high-speed switching system, one may omit a power amplifier and those known circuit arrangements which require high power.

D. Because use is made of an excitation current in the form of a wave whose amplitude changes gradually in sinusoidal or triangular wave fashion, special circuits to eliminate the effects of electromagnetic induction produced by high-frequency harmonics are not required.

E. Because commercial electric power is used as the power source, the present excitation system may be used in conjunction with an electromagnetic flowmeter having a relatively large diameter, whereby accurate flow measurement may be realized to measure fluids having a non-uniform flow velocity profile without undesirable consequences.

While there have been shown and described preferred embodiments of an electromagnetic flowmeter in accordance with the invention, it will be appreciated that many changes and modifications may be made therein without, however, departing from the essential spirit thereof.

I claim:

1. In an electromagnetic flowmeter comprising:
    A. a flow tube through which a fluid to be metered is conducted to intersect a magnetic field therein which is transverse to the direction of flow and is produced by an electromagnet having excitation coils;
    B. a pair of electrodes mounted at diametrically-opposed positions in said tube, said electrodes each having a relatively large surface area whereby the electromotive force induced in the fluid intersecting the field and detected by the electrodes is averaged to minimize the effect of a non-uniform flow velocity on the accuracy of the meter; and
    C. an excitation system for supply current to said coils, said system being constituted by:
        a. a power source energized by a commercial a-c power line having a predetermined frequency and providing a direct voltage;
        b. electronic switching means interposed between said direct voltage source and said coils;
        c. control means to effect an on-off operation of said switching means at a pulse rate which is higher than the frequency of said a-c line; and
        d. means gradually changing the duty cycle of said control means at a low-frequency rate which is less than said line frequency.

2. An excitation system as set forth in claim 1, wherein said power source is constituted by a full-wave rectifier coupled to said a-c power line.

3. An excitation system as set forth in claim 2, wherein said means to gradually change the duty cycle is constituted by a sinusoidal-wave generator.

4. An excitation system as set forth in claim 3, wherein said sinusoidal wave generator is constituted by a frequency divider coupled to the output of said full-wave rectifier to produce low-frequency rectangular pulses which are applied to a filter to convert the rectangular pulses to a sinusoidal wave.

5. In an electromagnetic flowmeter as set forth in claim 4, wherein said sinusoidal wave is applied to a current controller and compared therein with the sinusoidal voltage produced across a resistor connected in series with said coils to produce an error signal for regulating the high-frequency pulses applied to said switching means.

6. An excitation system as set forth in claim 1, wherein said switching means is constituted by a switching transistor.

7. In an electromagnetic flowmeter as set forth in claim 1, wherein said electrodes are coupled to a signal converter including a voltage divider that divides the signal derived from said electrodes with a reference signal derived from a resistor in series with said excitation coils.

* * * * *